Patented Dec. 31, 1940

2,227,400

UNITED STATES PATENT OFFICE 2,227,400

PROCESS FOR PREPARING ACYLAMINO NITRO DIPHENYL SULPHONES

Richard O. Roblin, Jr., Stamford, and James H. Williams, Riverside, Conn., assignors to American Cyanamid Company, New York, N. Y., a corporation of Maine No Drawing. Application June 24, 1939, Serial No. 280,969

3 Claims. (Cl. 260—562)

This invention relates to p-acylamino-p'-nitrodiphenyl sulphones, and to a process for preparing them.

The compounds of the present invention have the following general formula:

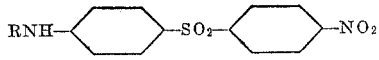

in which R is an acyl radical. They are effective in the treatment of infectious diseases, and particularly streptococcus and pneumococcus infections, while being at the same time relatively non-toxic.

Insofar as the new products are concerned, the present invention is not limited to any particular method of their preparation. However, there is also included in a more specific embodiment of the invention an improved process for the preparation of the p-acylamino-p'-nitrodiphenyl sulphones.

Attempts to prepare the sulphones of the present invention by the reaction of p-acylaminobenzene sulfinic acid and p-nitrochlor- or p-nitrobrom-benzene in the presence of a base and a solvent boiling below 100° C. have been unsuccessful. Poor yields are obtained if the reaction is effected in a solvent boiling at about 130° C., for example, a water-carbitol mixture and blackening and decomposition occur if the solvent chosen has too high a boiling point, e. g., ethylene glycol boiling at 197° C.

We have found that the use of a solvent having a boiling point preferably slightly above the melting point of the sulfinic acid (155° C.) improves the yield of sulphone. Solvents having boiling points within the range of 150°-180° C. are useful and it should be understood that the invention includes all solvents or classes of solvents falling within this range. Excellent results, however, are obtained with monohydric saturated alcohols such as cyclohexanol which boils at 160°-161° C., and this is the preferred embodiment of the invention.

Care must be taken that the process of the present invention be run only for a limited period of time. For example, if the reaction is run in cyclohexanol in the presence of potassium acetate, a heating period of three hours yields about 50% product. A longer period of heating cuts down the yield.

We have not definitely determined why some solvents such as cyclohexanol give better results than other solvents within the 150°-180° C. boiling range. It is known that p-acylamino-p'-nitrodiphenyl sulphones and p-nitrochlor- or p-nitrobrom-benzene cannot be reacted without a solvent because the halogen compound tends to sublime from the reaction mixture; this also applies to the use of higher boiling solvents at temperatures below reflux and even with solvents such as ethylene glycol at reflux. Apparently the cyclohexanol holds the halogen compound in solution better than the other high-boiling solvents and since the reaction mixture in which cyclohexanol is used tends to gel on cooling, some sort of colloid formation may take place. However, the invention is not intended to be limited to any particular theory of reaction mechanism.

It is a further advantage of the present invention that its process improves the method of preparation of p-acylamino-p'-aminodiphenyl sulphones, for which compounds those of the present invention can be used as intermediates. The p-acylamino-p'-aminodiphenyl sulphones are claimed in our copending application, Serial No. 233,244 filed October 4, 1938, of which the present application is, in part, a continuation.

The present invention will be described in greater detail in conjunction with the following example which is illustrative only and is not intended to limit the scope of the invention to specific details therein set forth.

*Example*

A mixture of 20 g. (0.1 mol) of p-nitrobrombenzene, 25 g. (0.125 mol) of p-acetylaminobenzene sulfinic acid, 15 g. (0.15 mol) of potassium acetate and 250 cc. of cyclohexanol was refluxed for three hours. The entire batch was then steam distilled to remove cyclohexanol and any unreacted p-nitrobrombenzene. The residue after steam distillation was broken up with 35 cc. of glacial acetic acid, filtered and washed with water. Based on the p-nitrobrombenzene used, a 50% yield of a material melting at 216°-217° C. was obtained. When recrystallized from glacial acetic acid, the product melted at 226° C.

In the present specification and claims, the term "acyl" is used to denote the acidic radical of an organic carboxylic acid and it should be understood that no broader interpretation of the scope of the term is intended.

What we claim is:

1. The method of preparing a p-amino-p'-nitrodiphenyl sulphone, the amino group being acylated with the acyl radical of a lower fatty acid which comprises reacting the corresponding p-acylaminobenzene sulfinic acid with a member of the group consisting of p-nitrochlor- and p-nitrobrom-benzene in the presence of a solvent having a boiling point between 150° and 180° C.

2. The method of preparing a p-amino-p'-nitrodiphenyl sulphone, the amino group being acylated with the acyl radical of a lower fatty acid which comprises reacting the corresponding p-acylaminobenzene sulfinic acid with a member of the group consisting of p-nitrochlor- and p-nitrobrom-benzene in the presence of a monohydric saturated alcohol having a boiling point between 150° and 180° C.

3. The method of preparing p-acetyl-p'-nitrodiphenyl sulphone which comprises reacting p-acetylaminobenzene sulfinic acid with p-nitrobrombenzene in the presence of cyclohexanol.

RICHARD O. ROBLIN, Jr.
JAMES H. WILLIAMS.